US011731403B2

(12) United States Patent
Oh

(10) Patent No.: US 11,731,403 B2
(45) Date of Patent: Aug. 22, 2023

(54) SOUND INSULATION FLOORING MATERIAL

(71) Applicants: DONGSHIN POLYMER CO., LTD., Chungcheongnam-do (KR); SHINKO KASEI CO., LTD., Hanyu (JP)

(72) Inventor: Dong Jin Oh, Chungcheongnam-do (KR)

(73) Assignees: DONGSHIN POLYMER CO., LTD., Chungcheongnam-do (KR); SHINKO KASEI CO., LTD, Hanyu (JP)

( * ) Notice: Subject to any disclaimer, the term of this patent is extended or adjusted under 35 U.S.C. 154(b) by 137 days.

(21) Appl. No.: 16/611,683

(22) PCT Filed: Aug. 12, 2019

(86) PCT No.: PCT/KR2019/010223
§ 371 (c)(1),
(2) Date: Nov. 7, 2019

(87) PCT Pub. No.: WO2020/045857
PCT Pub. Date: Mar. 5, 2020

(65) Prior Publication Data
US 2021/0114355 A1    Apr. 22, 2021

(30) Foreign Application Priority Data

Aug. 30, 2018 (KR) .................. 10-2018-0102749

(51) Int. Cl.
*B32B 27/06* (2006.01)
*B32B 5/02* (2006.01)
(Continued)

(52) U.S. Cl.
CPC ............. *B32B 27/065* (2013.01); *B32B 5/02* (2013.01); *B32B 5/18* (2013.01); *B32B 7/06* (2013.01);
(Continued)

(58) Field of Classification Search
CPC .... B32B 5/02; B32B 5/18; B32B 5/24; B32B 7/06; B32B 7/12; B32B 17/02;
(Continued)

(56) References Cited

U.S. PATENT DOCUMENTS

2009/0239069 A1* 9/2009 Yonehama .............. B32B 27/38
428/354
2017/0073885 A1* 3/2017 Carroll ...................... B32B 5/24
(Continued)

FOREIGN PATENT DOCUMENTS

EP        2385079 A1 * 11/2011 ............. B32B 27/32
JP   2000-001561 A      1/2000
(Continued)

OTHER PUBLICATIONS

English Machine translation of the description of JP-2012116173-A obtained from ESPACENET (Year: 2012).*
(Continued)

*Primary Examiner* — James C Yager
*Assistant Examiner* — Thomas J Kessler
(74) *Attorney, Agent, or Firm* — NKL Law; Jae Youn Kim

(57) ABSTRACT

A sound insulation flooring material according to the present invention in which a heat resistance, sound insulation, and adhesion are improved is implemented by sequentially stacking a plurality of layers, a first balance layer, a second balance layer, a primer layer, a PE foam layer, and a PE release paper layer. In this case, the primer layer includes a first composition, a second composition, and a curing agent, and the first composition includes a resin, propanol, 1-methoxy-2-propanol, propyl acetate, isopropanol, butanone, and water.

16 Claims, 1 Drawing Sheet

(51) Int. Cl.
  *B32B 5/18* (2006.01)
  *B32B 7/06* (2019.01)
  *B32B 17/02* (2006.01)
  *B32B 27/30* (2006.01)
  *B32B 27/32* (2006.01)
  *E04F 15/18* (2006.01)

(52) U.S. Cl.
  CPC ............ *B32B 17/02* (2013.01); *B32B 27/304* (2013.01); *B32B 27/32* (2013.01); *E04F 15/181* (2013.01); *B32B 2255/10* (2013.01); *B32B 2262/101* (2013.01); *B32B 2266/025* (2013.01); *B32B 2307/102* (2013.01); *B32B 2307/748* (2013.01); *B32B 2419/04* (2013.01)

(58) Field of Classification Search
  CPC ..... B32B 27/065; B32B 27/08; B32B 27/304; B32B 27/32; B32B 29/007; B32B 2250/05; B32B 2255/10; B32B 2255/26; B32B 2260/028; B32B 2260/046; B32B 2262/101; B32B 2266/025; B32B 2307/102; B32B 2307/306; B32B 2307/748; B32B 2419/04; E04F 15/0215; E04F 15/107; E04F 15/181; E04F 15/20; E04F 15/206; E04F 2290/041; E04F 2290/043
  See application file for complete search history.

(56) References Cited

U.S. PATENT DOCUMENTS

| | | | |
|---|---|---|---|
| 2017/0165943 A1* | 6/2017 | Kim | B32B 38/08 |
| 2018/0086035 A1* | 3/2018 | Yuon | B32B 37/10 |
| 2021/0086476 A1* | 3/2021 | Lehmann | A47G 1/175 |

FOREIGN PATENT DOCUMENTS

| | | | | | |
|---|---|---|---|---|---|
| JP | 2012116173 A | * | 6/2012 | | |
| KR | 10-0510836 B1 | | 8/2005 | | |
| KR | 10-0600841 B1 | | 7/2006 | | |
| KR | 10-2011-0093282 A | | 8/2011 | | |
| KR | 10-1149890 B1 | | 5/2012 | | |
| KR | 10-2015-0007431 A | | 1/2015 | | |
| KR | 10-1480629 B1 | | 1/2015 | | |
| KR | 10-2018-0032764 A | | 4/2018 | | |
| KR | 20180063997 A | * | 6/2018 | | |
| WO | WO-2009116648 A1 | * | 9/2009 | ............... | B32B 7/12 |
| WO | WO-2018183195 A1 | * | 10/2018 | ............... | B32B 5/18 |

OTHER PUBLICATIONS

English Machine translation of the description of WO-2009116648-A1 obtained from ESPACENET (Year: 2009).*

English Machine translation of the description of KR-20180063997-A obtained from ESPACENET (Year: 2018).*

* cited by examiner

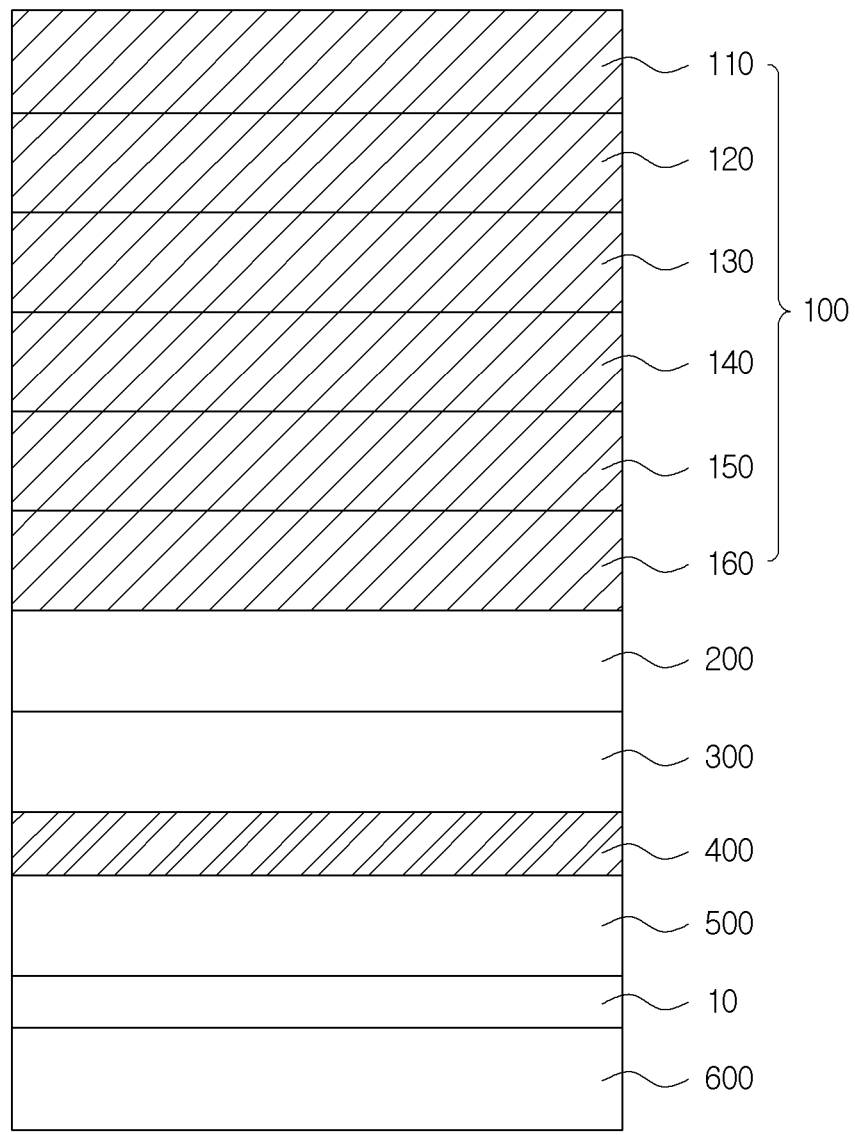

SOUND INSULATION FLOORING MATERIAL

TECHNICAL FIELD

The present invention relates to a flooring material which may be applied to a bottom or a floor of a building, and more particularly, to a sound insulation flooring material in which a heat resistance, sound insulation, and adhesion are improved.

BACKGROUND ART

In general, flooring materials (decorations) such as floor coverings or tiles are installed on a bottom or a floor of a building. The flooring materials such as floor coverings or tiles are formed of vinyl chloride as a main material, which is light, flexible, and excellent in cushioning and sound absorption.

The flooring material is formed by mixing or laminating other materials to polyvinyl chloride (PVC) or vinyl chloride. Such a flooring material is usually formed by laminating a plurality of layers such as a transparent layer, a print layer, a resin-impregnated dimensional reinforcement layer, a foam layer, and a balancing layer. The transparent layer functions to protect an ink surface printed on the print layer, the print layer functions to perform decoration with a color or a pattern, the resin-impregnated dimensional reinforcement layer is a glass fiber impregnated with a urethane resin and functions to reinforce dimensional stability of a product, the foam layer functions to obtain a cushioning effect, and the balancing layer functions to obtain reinforcement and seating stability with respect to a bottom surface.

If necessary, a coating layer may be further provided on a transparent film layer to improve an abrasion resistance or a scratch resistance. The flooring material is produced by adding or subtracting each of the layers according to the use, and is used in a broad range of fields as disclosed in patent documents attached below.

(Patent document 1) Korean Patent Registration No. 10-0510836 (registered on Aug. 30, 2005)
(Patent document 2) Korean Patent Registration No. 10-0600841 (registered on Jul. 6, 2006)
(Patent document 3) Korean Patent Registration No. 10-1149890 (registered on May 18, 2012)

Since conventional flooring materials as described above do not collectively satisfy the heat resistance, the sound insulation, and the adhesion, it is required to develop a flooring material that is functional and has an excellent durability.

DISCLOSURE

Technical Problem

An object of the present invention is to provide a sound insulation flooring material that collectively satisfies a heat resistance, sound insulation, and adhesion.

Technical Solution

To achieve the object described above, according to the present invention, there is provided a sound insulation flooring material including: a plurality of layers; a first balance layer formed under the plurality of layers; a second balance layer formed under the first balance layer; a primer layer formed under the second balance layer; a PE foam layer formed under the primer layer; and a PE release paper layer formed under the PE foam layer.

The primer layer is formed of a composition including a first composition, a second composition, and a curing agent, and the first composition includes a resin, propanol, 1-methoxy-2-propanol, propyl acetate, isopropanol, butanone, and water.

Advantageous Effects

The sound insulation flooring material according to the present invention has an advantage that the heat resistance and the adhesion are improved by including a primer layer formed of a certain component, and the sound insulation is improved by applying an electron beam cross-linked PE foam as compared with a conventional flooring material.

DESCRIPTION OF DRAWINGS

FIG. 1 is a view showing a sound insulation flooring material according to one embodiment of the present invention.

BEST MODE

Hereinafter, exemplary embodiments will be described in detail. However, while describing the present invention, the description of generally known functions or configurations will be omitted in order to clarify the subject matter of the present invention.

FIG. 1 is a view showing a sound insulation flooring material according to one embodiment of the present invention.

Referring to FIG. 1, a sound insulation flooring material according to the present invention includes a plurality of layers 100, a first balance layer 200, a second balance layer 300, a primer layer 400, a PE foam layer 500, and a PE release paper layer 600. The plurality of layers 100, the first balance layer 200, the second balance layer 300, the primer layer 400, the PE foam layer 500, and the PE release paper layer 600 may be sequentially formed. In other words, the first balance layer 200 may be formed under the plurality of layers 100, the second balance layer 300 may be formed under the first balance layer 200, the primer layer 400 may be formed under the second balance layer 300, the PE foam layer 500 may be formed under the primer layer 400, and the PE release paper layer 600 may be formed under the PE foam layer 500. In this case, the term "under" may refer to, but is not limited to, a bottom surface directly under a corresponding layer, and a separate layer may be formed between the layers.

As shown in FIG. 1, the plurality of layers 100 may include a coating layer 110, a surface layer 120, a print layer 130, an intermediate layer 140, a glass fiber layer 150, and a base layer 160.

The coating layer 110 is preferably a UV coating layer, may be formed on the surface layer 120, is preferably implemented with a thickness of 5 to 12 μm. The surface layer 120 may be formed under the coating layer 110, may include 25 to 35 parts by weight of a plasticizer based on 100 parts by weight of PVC, and is preferably implemented with a thickness of 0.40 to 0.70 mm. The print layer 130 may be formed under the surface layer 130, may include 6 to 10 parts by weight of a plasticizer based on 100 parts by weight of PVC, and is preferably implemented with a thickness of 0.05 to 0.10 mm.

The intermediate layer 140 may be formed under the print layer 130, may include 40 to 60 parts by weight of a plasticizer and 400 to 550 parts by weight of $CaCO_3$ having a mesh size of 110 to 130 based on 100 parts by weight of PVC, and may further include talc or elvan powder which is a powder of hydrous silicate mineral of magnesium. In this case, the talc refers to a rock belonging to a monoclinic system having the same crystal structure as mica, has a color such as white, silver white, or light green, and belongs to a 2:1 type phyllosilicate similarly to pyrophyllite, and fine powder of the talc is referred to as talc powder in the fields of medicine and industry. The intermediate layer 140 is preferably implemented with a thickness of 0.5 to 0.8 mm.

The glass fiber layer 150 may be formed under the intermediate layer 140, may be prepared by mixing 60 to 90 parts by weight of a plasticizer and 50 to 70 parts by weight of $CaCO_3$, which is an inorganic filler for reinforcement, based on 100 parts by weight of PVC so as to prepare the mixture in the form of a sol in a container, impregnating a glass fiber in the container, and drying the glass fiber, and may allow the intermediate layer 140 to be laminated with the base layer 160. The glass fiber layer 150 may contain, for example, 55 $g/cm^2$ of G/F. The glass fiber layer 150 serves to prevent shrinkage, expansion, and curling, which are sensitively affected by an ambient temperature of a product. It may be impossible to produce a flooring material that can be actually used for a bottom without the glass fiber layer 150. The glass fiber layer 150 is preferably implemented with a thickness of 0.35 to 0.55 mm.

The base layer 160 may be formed under the glass fiber layer 150, may include 40 to 60 parts by weight of a plasticizer and 400 to 550 parts by weight of $CaCO_3$ having a mesh size of 60 to 80 based on 100 parts by weight of PVC, and is preferably implemented with a thickness of 1.8 to 2.5 mm.

The first balance layer 200 may be formed under the base layer 160, may include 20 to 30 parts by weight of a plasticizer based on 100 parts by weight of PVC, and is preferably implemented with a thickness of 0.2 to 1.0 mm.

The second balance layer 300 may be formed under the first balance layer 200, may include 20 to 30 parts by weight of a plasticizer based on 100 parts by weight of PVC, and is preferably implemented with the same thickness as the first balance layer 200 in order to increase efficiency of productivity.

The primer layer 400 may be formed under the second balance layer 300, may include a first composition, a second composition, and a curing agent, and preferably includes 45 to 55 parts by weight of the second composition and 4 to 6 parts by weight of the curing agent based on 100 parts by weight of the first composition. In order to improve an adhesive force, it is possible to consider a corona treatment or a combination of the corona treatment and primer coating, but the corona treatment may not be suitable because the second balance layer of the present invention is designed based on a PVC material.

Referring to a process of forming the primer layer 400, a primer composition including the first composition, a bottom of the second balance layer 300 is coated with the second composition, and the curing agent, hot air drying is performed in a drying box at 50° C. after the coating, and 40 to 50 hours of aging is performed in an aging chamber at 40° C. to form the primer layer 400 on a bottom surface of the second balance layer 300.

The first composition of the present invention may include a resin, propanol, 1-methoxy-2-propanol, propyl acetate, isopropanol, butanone, and water. The first composition may be a composition of basic components that forms the primer layer 400.

The resin may include various resin components that may be used as a primer such as a urethane-based resin and an epoxy resin, and may be included by 35 to 45 wt %. The propanol may include 1-propanol represented by a chemical formula of $CH_3CH_2CH_2OH$, and may be a material of CAS No. 71-23-8 which is propyl alcohol. The 1-methoxy-2-propanol may include a material of CAS No. 107-98-2 represented by a chemical formula of $CH_3CH(OH)CH_2OCH_3$. The propyl acetate may include a material of CAS No. 109-60-4 represented by a chemical formula of $CH_3COOCH_2CH_2CH_3$. The isopropanol may include a material of CAS No. 67-63-0 represented by a chemical formula of $(CH_3)_2CHOH$. The butanone may include a material of CAS No. 78-93-3 represented by a chemical formula of $C_2H_5COCH_3$. A weight ratio of the 1-methoxy-2-propanol to the butanone may be in the range of 1:1.5 to 1:3.5.

Table 1 below shows a change in adhesion according to the weight ratio of the 1-methoxy-2-propanol and the butanone. The primer layer 400 was formed between the second balance layer 300 and the PE foam layer 500 to test bond strength according to a KS F 2561 adhesion test scheme. The second composition and the curing agent that will be described below were tested by fixing the contents thereof.

TABLE 1

| | Weight ratio of 1-methoxy-2-propanol and butanone | | | | |
|---|---|---|---|---|---|
| | 1:1 | 1:1.5 | 1:3 | 1:3.5 | 1:4 |
| Bond strength ($N/nm^2$) | 2.2 | 3.2 | 3.4 | 3.5 | 3.0 |

Referring to Table 1, it was found that the bond strength varies depending on the weight ratio of the 1-methoxy-2-propanol and the butanone of the first composition included in the primer layer 400. It was found that the bond strength is rapidly increased when the weight ratio of the 1-methoxy-2-propanol and the butanone is 1:1.5, the bond strength is decreased when the weight ratio of the 1-methoxy-2-propanol and the butanone is 1:4, and optimum bond strength is obtained when the weight ratio of the 1-methoxy-2-propanol and the butanone is 1:1.5 to 1:3.5.

The first composition may include 35 to 45 wt % of the resin, 1 to 10 wt % of the propanol, 5 to 15 wt % of the 1-methoxy-2-propanol, 1 to 10 wt % of the propyl acetate, 1 to 5 wt % of the isopropanol, and 15 to 25 wt % of the butanone. It was found through the experiment that content ranges of the above materials are optimum content ranges that may achieve the object of the present invention through the organic combination of the materials.

The second composition may include isopropyl alcohol, ethyl acetate, and methyl ethyl ketone. The isopropyl alcohol may be included by 15 to 25 wt %, the ethyl acetate may be included by 35 to 45 wt %, and the methyl ethyl ketone may be included by 35 to 45 wt %. The second composition may be used as a diluent.

In this case, a weight ratio of the isopropyl alcohol to the methyl ethyl ketone may be 1:2.5 to 1:3. Table 2, which is attached below, shows results of testing the adhesion (bond strength) and a heat resistance according to the weight ratio of the isopropyl alcohol to the methyl ethyl ketone. The adhesion was tested in the same manner as in Table 1 by the KSF 2561 adhesion test scheme, and the heat resistance was obtained by measuring a time of discoloration (yellowing) in an oven at 130° C. The first composition and the curing agent were tested by fixing the contents thereof.

TABLE 2

| | Weight ratio of isopropyl alcohol to methyl ethyl ketone | | | | | | |
|---|---|---|---|---|---|---|---|
| | 1:1 | 1:1.5 | 1:2 | 1:2.5 | 1:3 | 1:3.5 | 1:4 |
| Bond strength (N/nm$^2$) | 3.5 | 3.6 | 4.0 | 4.1 | 4.1 | 4.2 | 3.8 |
| Heat resistance (Hr) | 25 | 26 | 28 | 32 | 35 | 36 | 36 |

Referring to Table 2, it was found that the bond strength and the heat resistance vary depending on the weight ratio of the isopropyl alcohol to the methyl ethyl ketone of the second composition. The bond strength according to the weight ratio of the isopropyl alcohol to the methyl ethyl ketone is optimal when the weight ratio of the isopropyl alcohol to the methyl ethyl ketone is 1:2 to 1:3.5, and the heat resistance is optimal when the weight ratio of the isopropyl alcohol to the methyl ethyl ketone is 1:2.5 or more. Therefore, it was found that both the bond strength and the heat resistance were excellent when the weight ratio of the isopropyl alcohol to the methyl ethyl ketone of the second composition is 1:2.5 to 1:3.5.

In this case, most preferably, the weight ratio of the isopropyl alcohol to the ethyl acetate and the methyl ethyl ketone may be 1:5.5 to 1:6.5. This is because it was found through the experiment that the adhesion is decreased when the weight ratio of the isopropyl alcohol to the ethyl acetate and the methyl ethyl ketone is less than 1:5.5, and the heat resistance is decreased when the weight ratio of the isopropyl alcohol to the ethyl acetate and the methyl ethyl ketone exceeds 1:6.5.

The curing agent may include 50 to 60 wt % of acetic acid ethyl ester and 40 to 50 wt % of the resin.

A content of the second composition may be 45 to 55 parts by weight based on 100 parts by weight of the first composition.

Table 3 below shows results of testing the adhesion and the heat resistance according to a weight of the second composition based on 100 parts by weight of the first composition. The test scheme is the same as in the schemes of Table 1 and Table 2. The test was performed on the second composition while a weight ratio (composition ratio) of isopropyl alcohol:ethyl acetate:methyl ethyl ketone is 2:4:4.

TABLE 3

| | Weight of second composition | | | | | |
|---|---|---|---|---|---|---|
| | 30 | 40 | 45 | 50 | 55 | 60 |
| Bond strength (N/nm$^2$) | 4.1 | 4.5 | 4.5 | 4.6 | 4.6 | 4.3 |
| Heat resistance (Hr) | 32 | 33 | 38 | 38 | 38.5 | 38 |

Referring to Table 3, it was found that the adhesion and the heat resistance vary depending on the weight of the second composition based on 100 parts by weight of the first composition. It was found that the adhesion is optimal when the weight of the second composition is 45 to 55 parts by weight based on 100 parts by weight of the first composition, and the heat resistance is optimal when the weight of the second composition is greater than or equal to 45 parts by weight based on 100 parts by weight of the first composition. Therefore, it was found that both the adhesion and the heat resistance is excellent when the weight of the second composition is 45 to 55 parts by weight based on 100 parts by weight of the first composition.

The primer layer 400 may be formed by coating the bottom of the second balance layer with the primer composition including the first composition, the second composition, and the curing agent by 45 to 50 μm, primarily drying the primer composition in the drying box at 50° C., and performing an aging process in the aging chamber at 40° C. The second balance layer 300 coated with the primer layer 400 may be laminated at a bottom of the first balance layer 200. The adhesion may be decreased when the primer layer is 45 μm or less, and the heat resistance may be decreased when the primer layer is 50 μm or more.

The PE foam layer 500 may be formed under the primer layer 400, and may include an electron beam cross-linked PE foam. The electron beam cross-linked PE foam may be formed by using low-density polyethylene as a matrix resin and sodium bicarbonate as a foaming agent. As described above, according to the present invention, a uniform foam layer may be formed of the electron beam cross-linked PE foam, and it was found through the experiment that sound insulation is improved by the above configuration. In addition, it was found through the experiment that the adhesion of the primer layer 400 is further improved as compared with a typical PE foam.

An electron beam may include a gamma ray, and an irradiation amount of the gamma ray may be 120 to 150 kGy.

Table 4 below shows results of testing the sound insulation and a dimensional change rate according to the irradiation amount of the gamma ray. The test was performed on a finished product shown in FIG. 1 while varying only the PE foam layer according to the irradiation amount of the gamma ray. The sound insulation (sound absorption) was measured by a tapping machine with a light-weight impact sound test (measurement scheme: five steel hammers respectively having a weight of 500 g were arranged at an interval of 10 cm, and the steel hammers performed consecutive free falling at an interval of 0.1 seconds at a height of 4 cm), and the dimensional change rate was calculated as a percentage by measuring dimensions shrunk or expanded after heating was performed for 24 hours at a temperature of 80° C.

TABLE 4

| | Irradiation amount of gamma ray (kGy) | | | | | |
|---|---|---|---|---|---|---|
| | 100 | 120 | 130 | 150 | 160 | 180 |
| Sound insulation (dB) | 52 | 48 | 48 | 46 | 46 | 49 |
| Dimensional change rate (%) | 0.06~0.09 | 0.01~0.03 | 0.01~0.02 | 0.01~0.03 | 0.05~0.08 | 0.06~0.09 |

Referring to Table 4, it was found that the sound insulation and the dimensional change rate vary depending on the irradiation amount of the gamma ray. It was found that the sound insulation is optimal when the irradiation amount of the gamma ray is 120 to 160 kGy, and the dimensional change rate is optimal when the irradiation amount of the gamma ray is 120 to 150 kGy. Therefore, it was found that the sound insulation and the dimensional change rate of the sound insulation flooring material of the present invention are optimal when the irradiation amount of the gamma ray is 120 to 150 kGy while the PE foam layer is formed. It was found through the experiment that such sound insulation and dimensional change rate also correspond to results of testing changes in tensile rates in a mechanical direction (MD) and a transverse direction (TD) according to the irradiation amount of the gamma ray. In other words, it was found through the experiment that the tensile rate in the mechanical direction (MD) is rapidly increased as compared with the tensile rate in the transverse direction (TD) when the irradiation amount of the gamma ray is 120 to 150 kGy.

In another embodiment, the PE foam layer 500 may be formed as a PE foam layer of which density changes uniformly. The density of the PE foam layer 500 may be implemented such that density of a top, that is, a surface bonded to the primer layer 400 is high, and the density is gradually decreased toward a bottom.

The PE release paper layer 600 may be formed under the PE foam layer 500. The PE release paper layer 600 may include a polyethylene sheet, and may include paper coated or impregnated with a polyethylene resin. The PE release paper layer 600 is preferably peeled off when the product is adhered.

A separate adhesive layer 10 may be added between the PE foam layer 500 and the PE release paper layer 600 in order to improve an adhesive force between the PE foam layer 500 and the PE release paper layer 600.

The sound insulation flooring material according to the present invention is preferably formed by applying a calender rolling process. Techniques related to the calender rolling process are known to those skilled in the art, so the description of the process will be omitted. In other words, various embodiments of a generally-known calender rolling process may be applied to a process of manufacturing the flooring material of the present invention.

It will be apparent to a person having ordinary skill in the art to which the invention pertains that the present invention is not limited to the above-described embodiments, and various changes and modifications can be made without departing from the spirit and scope of the present invention.

INDUSTRIAL APPLICABILITY

The sound insulation flooring material according to the present invention may be applied to a bottom or a floor of a building because the sound insulation flooring material is excellent in the adhesion, the heat resistance, and the sound insulation.

The invention claimed is:
1. A sound insulation flooring material comprising:
a plurality of layers;
a first balance layer formed under the plurality of layers;
a second balance layer formed under the first balance layer;
a primer layer formed under the second balance layer;
a polyethylene (PE) foam layer formed under the primer layer; and
a PE release paper layer formed under the PE foam layer,
wherein the primer layer is consisting of a first composition, a second composition, and a curing agent, and
the first composition is consisting of:
  a resin;
  propanol;
  1-methoxy-2-propanol;
  propyl acetate;
  isopropanol;
  butanone; and
  water,
wherein a weight ratio of the 1-methoxy-2-propanol to the butanone is 1:1.5 to 1:3.5,
wherein a content of the second composition is 45 to 55 parts by weight based on 100 parts by weight of the first composition,
wherein the second composition is consisting of isopropyl alcohol, ethyl acetate, and methyl ethyl ketone, and
wherein the curing agent is consisting of acetic acid ethyl ester and a second resin.

2. The sound insulation flooring material of claim 1, wherein the PE foam layer includes an electron beam cross-linked PE foam.

3. The sound insulation flooring material of claim 2, wherein the electron beam cross-linked PE foam is formed by using low-density polyethylene as a matrix resin and sodium bicarbonate as a foaming agent.

4. The sound insulation flooring material of claim 2, wherein the electron beam includes a gamma ray.

5. The sound insulation flooring material of claim 4, wherein an irradiation amount of the gamma ray is 120 to 150 kGy.

6. The sound insulation flooring material of claim 1, wherein the plurality of layers includes a coating layer, a surface layer, a print layer, an intermediate layer, a glass fiber layer, and a base layer.

7. The sound insulation flooring material of claim 6, wherein
the coating layer is an Ultraviolet (UV) coating layer formed on the surface layer and implemented with a thickness of 5 to 12 μm,
the surface layer is formed under the coating layer including 25 to 35 parts by weight of a plasticizer based on 100 parts by weight of polyvinyl chloride (PVC) and implemented with a thickness of 0.40 to 0.70 mm, and
the print layer is formed under the surface layer including 6 to 10 parts by weight of a plasticizer based on 100 parts by weight of PVC and implemented with a thickness of 0.05 to 0.10 mm.

8. The sound insulation flooring material of claim 6, wherein
the intermediate layer is formed under the print layer including 40 to 60 parts by weight of a plasticizer and 400 to 550 parts by weight of CaCO3 having a mesh size of 110 to 130 based on 100 parts by weight of PVC and implemented with a thickness of 0.5 to 0.8 mm,
the glass fiber layer is formed under the intermediate layer by mixing 60 to 90 parts by weight of a plasticizer and 50 to 70 parts by weight of CaCO3 based on 100 parts by weight of PVC and implemented with a thickness of 0.35 to 0.55 mm, and
the base layer is formed under the glass fiber layer including 40 to 60 parts by weight of a plasticizer and 400 to 550 parts by weight of CaCO3 having a mesh size of 60 to 80 based on 100 parts by weight of PVC and implemented with a thickness of 1.8 to 2.5 mm.

9. The sound insulation flooring material of claim 6, wherein
the first balance layer is formed under the base layer including 20 to 30 parts by weight of a plasticizer based on 100 parts by weight of PVC and implemented with a thickness of 0.2 to 1.0 mm, and
the second balance layer is formed under the first balance layer including 20 to 30 parts by weight of a plasticizer based on 100 parts by weight of PVC and implemented with 0.2 to 1.0 mm.

10. The sound insulation flooring material of claim 1, wherein the first composition includes 35 to 45 wt % of the resin, 1 to 10 wt % of the propanol, 1 to 10 wt % of the propyl acetate, and 1 to 5 wt % of the isopropanol.

11. The sound insulation flooring material of claim 1, wherein in the second composition, a weight ratio of the isopropyl alcohol to the methyl ethyl ketone is 1:2.5 to 1:3.5.

12. The sound insulation flooring material of claim 1, wherein in the second composition, a weight ratio of the isopropyl alcohol to the ethyl acetate and the methyl ethyl ketone is 1:5.5 to 1:6.5.

13. The sound insulation flooring material of claim 1, wherein in the second composition, a content of the isopropyl alcohol is 15 to 25 wt %, a content of the ethyl acetate is 35 to 45 wt %, and a content of the methyl ethyl ketone is 35 to 45 wt %.

14. The sound insulation flooring material of claim 1, wherein the curing agent includes 50 to 60 wt % of the acetic acid ethyl ester.

15. The sound insulation flooring material of claim 1, wherein the second composition of the primer layer is used as a diluent.

16. The sound insulation flooring material of claim 15, wherein in the second composition, a weight ratio of the isopropyl alcohol to the methyl ethyl ketone is 1:2.5 to 1:3.5, and
wherein in the second composition, a weight ratio of the isopropyl alcohol to the ethyl acetate and the methyl ethyl ketone is 1:5.5 to 1:6.5.

* * * * *